United States Patent [19]
Kamiyama et al.

[11] Patent Number: 5,422,400
[45] Date of Patent: Jun. 6, 1995

[54] METHOD FOR PRODUCING AN ETHYLENIC POLYMER COMPOSITION

[75] Inventors: Sakae Kamiyama; Masao Kawahara; Kunihiro Inamatsu; Keizo Kase; Kouji Mizokami; Tsuyoshi Matsumoto, all of Ichihara, Japan

[73] Assignee: Maruzen Polymer Company, Ltd., Tokyo, Japan

[21] Appl. No.: 285,762

[22] Filed: Aug. 3, 1994

Related U.S. Application Data

[63] Continuation of Ser. No. 964,908, Oct. 22, 1992, abandoned.

[30] Foreign Application Priority Data

Oct. 25, 1991 [JP] Japan ................................. 3-305650

[51] Int. Cl.⁶ .................... C08L 23/06; C08L 23/08
[52] U.S. Cl. .................... 525/240; 525/247; 525/270; 525/324; 526/116
[58] Field of Search ............... 525/240, 247, 270, 324; 526/116

[56] References Cited

U.S. PATENT DOCUMENTS 4,324,691  4/1982  Hartshorn et al. ............... 526/116
4,657,996  4/1987  Iwabuchi et al. ............... 526/127
4,975,485  12/1990 Sato et al. ....................... 525/53

FOREIGN PATENT DOCUMENTS 2056996   3/1981  United Kingdom .
WO92/07008 4/1992  WIPO .

OTHER PUBLICATIONS

Chemical Abstract, AN 117:8687j, JP 4–20510, Jan. 24, 1992.
Chemical Abstract, AN 117: 131731w, JP 4–91106, Mar. 24, 1992.
Chemical Abstract, AN 117: 131733y, JP 4–103604, Apr. 6, 1992.
*Hawley's Condensed Chemical Dictionary*, Van Nostrand Reinhold, N.Y., 1987, p. 577.

*Primary Examiner*—Romulo H. Delmendo
*Attorney, Agent, or Firm*—Oblon, Spivak, McClelland, Maier & Neustadt

[57] ABSTRACT

The invention relates to a method for producing an ethylenic polymer composition, suitable for molding, at high catalytic efficiency. The ethylenic polymer composition produced has as a high melt tension when melted, and a high melt modulus (die swell ratio). The process comprises a three step polymerization of an olefin employing a transition metal catalyst, the catalyst being produced in a specific manner.

9 Claims, No Drawings

METHOD FOR PRODUCING AN ETHYLENIC POLYMER COMPOSITION

This application is a Continuation of application Ser. No. 07/964,908, filed on Oct. 22, 1992, now abandoned.

The present invention relates to a method for producing an ethylenic polymer composition, whereby an ethylenic polymer composition having physical properties suitable for molding such as inflation molding or blow molding can be produced at excellent catalytic efficiency. More particularly, it relates to a method for efficiently producing an ethylenic polymer composition which has a high melt tension when melted, relative to the average molecular weight and which also has a high melt modulus (die swell ratio), by three step polymerization of an olefin employing a certain specific catalyst.

In the field of molding olefin polymers, there have been progresses in recent years in the trends for high speed, complexity in the shape, precision and large size. On the other hand, compliance to the changes or modifications of the molding conditions has been desired. For example, an inflation film is required to be molded under a stabilized condition with little swaying of the bubble even when molded at a high speed and even when some change has been made in the molding conditions. In the field of blow molding, it is desired that drawdown little occurs even when the molded product is of a large size, and the pinch-off edges of the product are of enough thickness.

In order to fulfill the above requirements for molding while maintaining good physical properties of a molded product, it is desired that the polymer has a given range of average molecular weight and MFR, and the molecular weight distribution is sufficiently wide, and the melt tension when melted is high relative to the molecular weight. It is generally believed such desired properties are almost essential requirements. Further, the melt modulus (die swell ratio) is desired to be high to some extent.

Various methods have been proposed to produce an ethylenic polymer or an ethylenic polymer composition having a high melt tension relative to such an average molecular weight or MFR. Such methods are generally classified into ① a method of incorporating a radical-generating agent (Japanese Unexamined Patent Publications No. 29841/1983 and No. 89341/1984), ② a method of selecting the type of the catalyst (Japanese Unexamined Patent Publication No. 304006/1988 and Japanese Patent Application Number 75606/1990), ③ a multi-step polymerization method containing a step for producing an ultra-high molecular weight component employing a certain specific catalyst or polymerization conditions (Japanese Examined Patent Publication No. 10724/1984 and Japanese Unexamined Patent Publications No. 227913/1984, No. 14207/1986, No. 130310/1986, No. 25105/1987, No. 79204/1989 and No. 155906/1990).

Among them, the method of incorporating a radical-generating agent has a problem that the resin deteriorates or the radical-generating agent is likely to react with other additives. By the method of selecting the type of the catalyst, no sufficient improvement in the melt tension is obtainable. With respect to the multi-step polymerization method, a number of patent applications have recently been made, and many of them claim that a wide range of catalysts can be used, but in substance, olefin polymerization is conducted usually under a limited combination of the catalyst and the polymerization conditions to obtain an ethylenic polymer composition containing a certain specific amount of an ultra-high molecular weight component having a specific molecular weight range or a specific copolymer composition. And, in each case, the number of low molecular weight components to be mixed or the ranges of molecular weights in the copolymer composition are different. Namely, ultra-high molecular weight polymers having the same intrinsic viscosity [$\eta$] may have different molecular weight distributions or structures depending upon the catalyst, etc., and thus have different effects on the melt tension and other properties.

Among the conventional techniques, some are inadequate in the improvement of the melt tension, and generally the type of the catalyst to be used is limited. Further, to obtain ethylenic polymer compositions having desired physical properties by applying the respective techniques (catalysts), there has been a restriction that the intrinsic viscosity [$\eta$] or the content of the ultra-high molecular weight component in the polymer must be within a specific narrow range. For example, in Japanese Unexamined Patent Publication No. 130310/1986 wherein a catalyst common to the present invention is used in that titanium and vanadium are used in combination as transition metals, no effects will be obtained unless the intrinsic viscosity [$\eta$] is at least 20. The applicable range of the technique (catalyst) of Japanese Examined Patent Publication No. 10724/1984 is limited to a content of the ultra-high molecular weight component of from 1.0 to 10%. In Japanese Unexamined Patent Publication No. 227913/1984, the intrinsic viscosity [$\eta$] of the ultra-high molecular weight component is limited to a level of at least 11 (preferably at least 12), and the content is limited to a level of from 5 to 23%. Besides, the intrinsic viscosity [$\eta$] of the final polymer must be at least 2.5 (preferably at least 3.0). On the other hand, in Japanese Unexamined Patent Publication No. 25105/1987, the content must be not higher than 5%, and the ultra-high molecular weight component must be polymerized at a temperature of lower than 30° C. Other patent publications have similar narrow limitations.

The fact that the catalyst to be used in a plant or the composition of the polymer has such limitations, particularly the fact that the lower limit of the intrinsic viscosity [$\eta$] of the ultra-high molecular weight component is high or the width of the content of the ultra-high molecular weight component, will limit the type of the product having a high melt tension capable of being produced by such a catalyst and will make it difficult to change the balance of the physical properties based on various needs or to make a modification taking into consideration of the production cost, and thus is industrially very disadvantageous. Further, in some patent publications, the polymerization temperature is limited to a narrow range, which is also disadvantageous. Therefore, it has been desired to develop a catalyst and a process whereby a ultra-high molecular weight component can be contained within a wide range of from a very small amount to a large amount, a high melt tension can be obtained without forming hard spots or gel over a wide range of the content, and in order to avoid deterioration of physical properties or processability due to insufficient mixing, such can be made possible with a ultra-high molecular weight component having a relatively low intrinsic viscosity.

The present inventors have conducted extensive research for a catalyst which has a high catalytic activity for three step polymerization without any particular restriction with respect to the polymerization temperature for the synthesis of the ultra-high molecular weight component, which is capable of providing a high melt tension without forming hard spots or gel over a wide range of the content of the ultra-high molecular weight component from a very little amount to a large amount and which is capable of doing so with a ultra-high molecular weight component having a relatively low intrinsic viscosity, and as a result, have found it possible to accomplish the above object by using a catalyst system having the transition metal component synthesized with specific materials and in a specific manner, which contains titanium and vanadium. The present invention has been accomplished on the basis of this discovery.

Thus, the present invention provides a method for producing an ethylenic polymer composition, which comprises polymerizing ethylene or copolymerizing ethylene with an α-olefin in the presence of a catalyst comprising a transition metal compound and an organic aluminum compound to produce an ethylenic polymer, wherein the transition metal compound is a product obtained by reacting the following components (A), (B), (C) and (D) so that component (D) is reacted last:

(A) a compound obtained by reacting a hydropolysiloxane with an organomagnesium compound, or a compound obtained by reacting such a compound further with at least one nucleophilic reagent selected from the group consisting of alcohols, aldehydes and ketones, (B) a titanium compound of the formula (I):

$$Ti(OR)_m X_{4-m} \qquad (I)$$

wherein R is a $C_1$–$C_{12}$ hydrocarbon group, X is a halogen atom, and $0 \leq m \leq 4$, (C) a vanadium compound of the formula (II) or (III):

$$VO(OR^1)_n X_{3-n} \qquad (II)$$

wherein $R^1$ is a $C_1$–$C_{12}$ hydrocarbon group, X is a halogen atom, and $0 \leq n < 3$, $$VX_4 \qquad (III)$$

wherein X is a halogen atom, (D) a silicon halide compound and/or an organic aluminum halide compound, and as polymerization steps, the following three steps (a), (b) and (c) are conducted at an optional order:

(a) a step of forming a polyolefin having an intrinsic viscosity [η] of from 0.4 to 1.5, (b) a step of forming a polyolefin having an intrinsic viscosity [η] of from 0.7 to 6, and (c) a step of forming a polyolefin having an intrinsic viscosity [η] of from 6 to 20, wherein the polymerized amounts in the respective steps are controlled to be within the following ranges by weight ratio: {polymerized amount in step (a)+polymerized amount in step (b)}:polymerized amount in step (c)=100:0.3 to 100:40, and polymerized amount in step (a):polymerized amount in step (b)=70:30 to 30:70, so that the intrinsic viscosity [η] of the final product would be from 1 to 5.

Now, the present invention will be described in detail with reference to the preferred embodiments.

In the present invention, the ethylenic polymer means an ethylene homopolymer or a copolymer of ethylene with not more than 20% based on the ethylene of other olefin.

The hydropolysiloxane used for the synthesis of component (A) of the present invention is a linear or cyclic silicon-containing compound having a structural unit of the formula:

$$R^2_a H_b SiO$$

wherein $R^2$ is a $C_1$–$C_{12}$ hydrocarbon group, an alkoxy group or a phenoxy group, a is 0 or 1, and b is 1 or 2, provided a+b=2. The polymerization degree of the hydropolysiloxane is not particularly limited, and a hydropolysiloxane ranging from a liquid low polymer to a solid polymer may be used. The terminal structure of the hydropolysiloxane does not give any substantial influence and may be sealed with an inert group such as a trialkylsilyl group or a hydroalkylsilyl group. Specific examples include tetramethyldisiloxane, tetraethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane and chlorophenylhydropolysiloxane. Among these hydropolysiloxanes, those wherein $R^2$ is an alkyl group or a phenyl group are commonly employed.

The organomagnesium compound to be used as the other material for the synthesis of component (A) is a compound of the formula:

$$(MgR^3_2)_p \cdot (MgR^3 X)_q$$

wherein $R^3$ is a $C_1$–$C_{12}$ hydrocarbon group, X is a halogen atom, and each of p and q is a number of 0 to 1, provided p+q=1, obtainable by the reaction of a halogen-containing organic compound with metal magnesium, and an ether complex thereof, or a mixture thereof. For example, in a case where p=0 and q=1, the compound is a so-called Grignard reagent in a narrow sense represented by $MgR^3 X$. When p=1 and q=0, it is dihydrocarbylmagnesium represented by $MgR^3_2$. When each of p and q takes an intermediate value, the compound represents an organic magnesium halide represented by the formula $(MgR^3_2)_p \cdot (MgR^3 X)_q$. Among them $MgR^3 X$ is most commonly employed.

The above organomagnesium compound can readily be synthesized by a conventional method in an ether type solvent such as diethyl ether, dibutyl ether or tetrahydrofuran or in a hydrocarbon type solvent such as heptane or toluene in the presence of a suitable amount of a complexing agent such as an ether or an amine.

Specific examples of $MgR_3X$ include methylmagnesium chloride, ethylmagnesium chloride, ethylmagnesium bromide, n-propylmagnesium chloride, n-butylmagnesium chloride, tert-butylmagnesium chloride, n-octylmagnesium chloride and phenylmagnesium chloride.

Specific examples of $MgR^3_2$ include diethylmagnesium, di-n-propylmagnesium, n-butylethylmagnesium, di-tert-butylmagnesium, di-n-octylmagnesium and diphenylmagnesium.

As a method for reacting the hydroxypolysiloxane with the organomagnesium compound, the following method is employed.

Namely, to the organomagnesium compound prepared in a suitable solvent, the hydropolysiloxane is slowly added under stirring, and after the entire amount is added, the mixture is heated and reacted for a predetermined period of time. Otherwise, in the same manner as in the synthesis of the organomagnesium compound, metal magnesium is dispersed in a suitable solvent, and a mixture comprising a halogen-containing organic compound and the hydroxypolysiloxane is dropwise added at a predetermined temperature under stirring, and then the mixture is reacted for a predetermined period of time. The reaction is conducted usually at a temperature of from 20° to 100° C., preferably from 30° to 80° C. for from 1 to 5 hours. If the temperature is higher than 100° C., the Si—H bond is likely to be decomposed, such being undesirable. The ratio of the hydroxypolysiloxane and the organomagnesium compound charged is a molar ratio of $MgR^3$:Si of from 1:1 to 1:20, preferably from 1:1 to 1:5.

The reaction of $MgR^3X$ with methylhydropolysiloxane is known to proceed as follows:

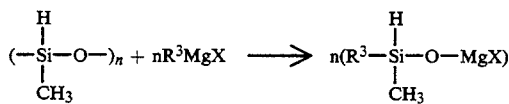

The reaction product of the hydropolysiloxane with the organomagnesium compound is obtained in the form of a solution when an organomagnesium compound prepared in tetrahydrofuran is used, or in a suspended form when a linear ether compound is used.

As component (A), the reaction product of the above hydropolysiloxane with the organomagnesium compound may be used as it is. However, a nucleophilic reagent may further be reacted to this reaction product. The nucleophilic reagent to be used here is selected from the group consisting of alcohols, aldehydes and ketones. Specific examples include methanol, ethanol, n-propanol, n-butanol, sec-butanol, octanol, 2-ethylhexanol, n-decanol, stearylalcohol, cyclohexanol, benzylalcohol, phenol, cresol, formaldehyde, acetaldehyde, propylaldehyde, n-butylaldehyde, isobutylaldehyde, valeraldehyde, isohexaldehyde, n-octylaldehyde, 2-ethylhexaldehyde, decaldehyde, stearylaldehyde, benzaldehyde, acetone, methyl ethyl ketone, di-n-butyl ketone, di-n-butyl ketone, di-n-octyl ketone, ethyl hexyl ketone, benzophenone and cyclohexanone.

The reaction of the above nucleophilic reagent with the compound obtained by reacting the hydropolysiloxane with the organomagnesium compound, can be conducted by dropwise adding the nucleophilic reagent to said compound under stirring. After the dropwise addition, the mixture is sometimes preferably reacted at a temperature of from 30° to 100° C. for from 1 to 5 hours. This reaction may be conducted in a hydrocarbon solvent. The nucleophilic reagent is used in an amount of not higher than 1.0 mol per mol of the Si—H group in the compound obtained by reacting the hydropolysiloxane with the organomagnesium compound and at least 0.5 mol per g.atom of Mg. If the amount of the nucleophilic reagent exceeds 1.0 mol per mol of the Si—H group, the catalytic activity is likely to be low, and if the amount is less than 0.5 mol per g.atom of Mg, the removal of an ether compound as the solvent for the organomagnesium compound will be inadequate, such being undesirable.

As a method for removing the ether compound as the solvent for the organomagnesium compound from the reaction product of the hydropolysiloxane with the organomagnesium compound or from the reaction mixture of such reaction product with the nucleophilic reagent and obtaining component (A) soluble or suspended in an inert hydrocarbon, it is advisable to employ a method of adding an inert hydrocarbon having a boiling point higher than the ether, to the reaction mixture and removing the ether compound by distillation. In such a case, the pot temperature is preferably not higher than 150° C., more preferably not higher than 100° C. If the pot temperature is higher than 150° C., formation of by-products tends to be substantial, whereby the catalytic activity tends to deteriorate. The smaller the residual amount of the ether compound in component (A), the better. the residual amount of the ether compound is preferably not more than 0.4 mol, more preferably not more than 0.2 mol, per g.atom of Mg.

The titanium compound to be used for component (B) of the present invention is represented by the following formula (I):

$$Ti(OR)_mX_{4-m} \qquad (I)$$

wherein R is a $C_1$–$C_{12}$ hydrocarbon group, X is a halogen atom, preferably a chlorine atom, and $0 \leq m \leq 4$. Specific examples of this titanium compound include $TiCl_4$, $TiBr_4$, $Ti(OC_4H_9)_3Cl$, $Ti(OC_4H_9)_2Cl_2$, $Ti(OC_4H_9)Cl_3$, $Ti(OC_4H_9)_4$, $Ti(OC_3H_7)_3Cl$, $Ti(OC_3H_7)_4$ and $Ti(OC_2H_6)_4$.

The vanadium compound to be used for component (C) of the present invention is represented by the formula (II) or (III):

$$VO(OR^1)_nX_{3-n} \qquad (II)$$

wherein $R^1$ is a $C_1$–$C_{12}$ hydrocarbon group, X is a halogen atom, and $0 \leq n \leq 3$, $$VX_4 \qquad (III)$$

wherein X is a halogen atom.

Specific examples of the vanadium compound include $VOCl_3$, $VO(OC_2H_5)Cl_2$, $VO(OC_2H_5)_2Cl$, $VO(OC_3H_7)Cl_2$, $VO(OC_4H_9)Cl_2$, $VO(OC_2H_5)_3$, $VO(OC_4H_9)_3$ and $VCl_4$. Among these vanadium compounds, those of the formula (II) wherein X is a chlorine atom are commonly used.

When components (B) and (C) of the present invention are soluble in a hydrocarbon solvent, they are preferably used in the form of a hydrocarbon solution.

The silicon halide compound to be used for component (D) of the present invention is preferably a compound of the formula $R^4_rSiX_{4-r}$ wherein $R^4$ is a hydrogen atom or a $C_1$–$C_8$ hydrocarbon group, X is a halogen atom, and $0 \leq r \leq 3$. Specific examples thereof include $SiCl_4$, $SiBr_4$, $HSiCl_3$, $CH_3SiCl_3$, $C_2H_5SiCl_3$, n-$C_3H_7SiCl_3$, $C_6H_5SiCl_3$, $(CH_3)_2SiCl_2$, $(C_2H_5)_2SiCl_2$ and $(CH_3)_3SiCl$.

Further, the organic aluminum halide compound is preferably a compound of the formula $R^5_sAlX_{3-s}$ wherein $R^5$ is a $C_1$–$C_{12}$ hydrocarbon group, X is a halogen atom, and $1 \leq s \leq 2$. Specific examples thereof include $(CH_3)_2AlCl$, $CH_3AlCl_2$, $(C_2H_5)_2AlCl$, $C_2H_5AlCl_2$, $(C_2H_5)_{1.5}AlCl_{1.5}$, (i-$C_4H_9)_2AlCl$, (i-$C_4H_9)AlCl_2$ and (n-$C_9H_{17})_2AlCl$. Among them, an alkyl aluminum chloride such as $(C_2H_5)_2AlCl$, $C_2H_5AlCl_2$ or $(C_2H_5)_{1.5}AlCl_{1.5}$ is preferably employed.

The above silicon halide compound and the organic aluminum halide compound may be used alone or in combination as a mixture, as component (D).

Now, the blending proportions of components (A), (B), (C) and (D) will be described.

With respect to components (B) and (C) being starting material components for transition metals, component (B) is required to be from 0.001 to 0.5 mol per g.atom of Mg in component (A) and component (C) is required to be from 0.01 to 1 mol per g.atom of Mg in component (A). If they are outside these ranges, no adequate effects of the present invention tend to be obtained, or the catalytic activities tend to remarkably deteriorate. Preferred ranges are from 0.01 to 0.3 mol and from 0.03 to 0.5 mol, respectively. With respect to component (D), the silicon halide compound is incorporated in an amount of from 0.1 to 5.0 mol, preferably from 0.5 to 2.0 mol, per g.atom of Mg in component (A), and the organic aluminum halide compound is blended in an amount of from 0.1 to 50 mol, preferably from 0.5 to 10 mol, per g.atom of Mg in component (A).

Components (B) and (C) being starting material components for transition metals may be preliminarily mixed and reacted for use. In such a case, the reaction is preferably conducted at a temperature of from 20° to 150° C. in a hydrocarbon solvent such as n-hexane, decalin or toluene.

In the present invention, the transition metal compound is obtained by the reaction of components (A), (B), (C) and (D). Among them, component (D) is required to be reacted last. In other orders, even if the respective components of the present invention are employed, the catalytic activities tend to be very low, or the effects of the present invention tend to be hardly obtainable.

There is no particular restriction as to the order of reactions among components (A), (B) and (C). However, it is common to firstly mix and react components (B) and (C) being starting material components for transition metals, and then react the reaction mixture with component (A).

The reactions of the above components are preferably conducted in an aliphatic or aromatic hydrocarbon solvent such as n-hexane, decalin or toluene. In each reaction, the reaction temperature is usually from 10° to 100° C., and the reaction time is usually from 10 minutes to 5 hours.

After completion of the reactions, the reaction product may be used as it is, as a transition metal compound constituting the catalyst of the present invention. Further, a solid component obtained by subjecting this reaction product to filtration or a solid component obtained by further cleaning such a solid component with an inert hydrocarbon solvent such as hexane, heptane or kerosene, may also be used as a transition metal compound constituting the catalyst to accomplish the purpose of the present invention.

The organic aluminum compound as the other component constituting the catalyst of the present invention is a compound of the formula $R^4_c AlY_{3-c}$ wherein $R^4$ is a $C_1-C_{12}$ hydrocarbon group, Y is a hydrogen atom, a halogen atom or an alkoxide group, and $1 \leq c \leq 3$. Specific examples thereof include $Al(CH_3)_3$, $Al(C_2H_5)_3$, $Al(i-C_4H_9)_3$, $(C_2H_5)_2AlCl$, $(C_2H_5)_{1.5}AlCl_{1.5}$, $(C_2H_5)_2AlH$, $(i-C_4H_9)_2AlCl$, $(i-C_4H_9)_2AlH$ and $(C_2H_5)_2Al(OC_2H_5)$.

The catalyst to be used for the polymerization of an olefin according to the present invention can readily be prepared by contacting the above transition metal compound with the organic aluminum compound. The proportions of both compounds are such that the ratio of the total g.atom of Ti and V in the above transition metal compound to the mols of the organic aluminum compound is from 1:1 to 1:1,000, preferably from 1:10 to 1:200.

The effects of the present invention can be obtained by polymerizing an olefin in the above mentioned three steps using the above catalyst.

In steps (a), (b) and (c), ethylenic polymers having different intrinsic viscosities are formed at certain specific amounts, respectively, relative to the final product. This is necessary for the final product to have well balanced physical processability to obtain a blow molding product, an extrusion molding product or a film forming product, and at the same time, this is essential for the characteristic ultra-high molecular portion produced by the catalyst of the present invention to mix well with the rest to obtain the effects of the present invention i.e. to incorporate a ultra-high molecular weight component having a relatively low intrinsic viscosity to a polymer composition having a high melt tension relative to MFR. The content of this ultra-high molecular weight component may be varied within a wide range of from a very small amount to a relatively large amount.

If the intrinsic viscosity of the ethylenic polymer produced in step (a) is less than 0.4 and the intrinsic viscosities in steps (b) and (c) are selected so that they are compatible thereto, the overall ratio of the portion of relatively small molecular weight tends to be too large, whereby the strength of the final product tends to be low. On the other hand, if the intrinsic viscosities in steps (b) and (c) are selected to maintain the strength, mixing of the components of steps (b) and (c) and the component of step (a) tends to be poor, whereby when the final product is molded, hard spots, gel or fish-eyes are likely to form. Further, if the intrinsic viscosity of the ethylenic polymer produced in step (b) is higher than 6, mixing with the component produced in step (a) tends to be poor, and the difficulty as described above will result. If the intrinsic viscosity of the ethylenic polymer produced in step (a) is higher than 1.5, the fluidity of the final product during the molding tends to be inadequate. If the intrinsic viscosities of the ethylenic polymers produced in steps (a) and (b) are less than the respective lower limits, the component obtained in step (c) being a ultra-high molecular weight component and the components obtained in steps (a) and (b) tend to be hardly mixed, whereby hard spots or gel tends to form, and in some cases, a high melt tension relative to MFR will not be obtained.

Further, if the intrinsic viscosity of the component obtained in step (c) being a ultra-high molecular weight component is less than 6, it tends to be difficult to obtain "a high melt tension relative to MFR" which is the feature of the present invention. On the other hand, if the intrinsic viscosity of the component obtained in step (c) is higher than 20, mixing with the components obtained in steps (a) and (b) will be inadequate, whereby hard spots, gel or fish-eyes are likely to form when the final product is molded, and the dependency of the melt modulus on the shear rate tends to increase.

In the method according to the present invention, the amount of the ethylenic polymer produced in step (c) which is the high molecular weight component is from 0.3 to 40% by weight of the total amount of the ethylenic polymers produced in steps (a) and (b). Thus, it is the features of the present invention that the amount of the ultra-high molecular weight component effective to impart a desired physical property, can be selected within a wide range of from a very small amount to a relatively large amount, and such can be accomplished with a ultra-high molecular weight component having a relatively low intrinsic viscosity. If the amount is less than 0.3% by weight, however, it tends to be difficult to attain "a high melt tension relative to MFR" which is the feature of the present invention. Further, if the amount exceeds 40% by weight, mixing with the ethylenic polymers produced in steps (a) and (b) tends to be inadequate, whereby the above mentioned drawback tends to result.

The weight ratio of the ethylenic polymer produced in step (a) to the ethylenic polymer produced in step (b) is within a range of from 70:30 to 30:70. If the ratio is outside this range, mixing of the two components tends to be inadequate, or mixing with the ethylenic polymer produced in step (c) which is the ultra-high molecular weight component, tends to be poor, whereby the object of the present invention tends to be hardly accomplished.

So long as the above conditions are satisfied, the order of the above three steps (a), (b) and (c) may be optionally selected to obtain the effects of the present invention. However, in a case where the blending proportion of the product obtained in step (c) is small, it is advantageous to conduct step (c) first from the viewpoint of the efficiency of the polymerization reactor.

The intrinsic viscosity [$\eta$] of the final product is from 1 to 5. If it is lower than 1, the entire molecular weight tend to be too low, whereby the physical properties tend to be poor. On the other hand, if it exceeds 5, the processability tends to be poor. Thus, either case is not suitable for the purpose of the present invention.

The method of the present invention is useful for the production of a composition comprising a polymer of ethylene and a copolymer of ethylene with an $\alpha$-olefin such as propylene, 1-butene, 1-hexene or 1-octene. In the case of the copolymer of ethylene with an $\alpha$-olefin, the $\alpha$-olefin may be introduced to all of the three-step polymerization or to a part thereof. It is particularly preferred to conduct ethylene polymerization in step (c) and copolymerization in steps (a) and (b), or to conduct all of the three steps by copolymerization. The content of the $\alpha$-olefin in the copolymer may vary depending upon the type of the $\alpha$-olefin, but is usually within a range of from 0 to 20 mol % to ethylene.

The polymerization method of the present invention may be applied to any one of slurry polymerization, gas phase polymerization or solution polymerization. The polymerization pressure is from atmospheric pressure to 50 kg/cm$^2$.

In the present invention, control of the intrinsic viscosity in each polymerization step can be conducted by adjusting the partial pressure of hydrogen and the polymerization temperature. Further, control of the amount of polymerization in each step may be conducted by adjusting the olefin supply rate per unit hour to each of the three polymerization reactors in the case of continuous polymerization, or by using accumulated values of the olefin supply amounts in the case of batch polymerization.

Now, the present invention will be described with reference to Examples. However, it should be understood that the present invention is by no means restricted to such specific Examples.

In the Examples, common methods for measuring physical properties are as follows.

MFR: JIS K 7210
   Melt index at a temperature of 190° C. under a load of 2.16 kg.
Intrinsic viscosity [$\eta$]:
   Measured in decalin at 135° C.
Melt tension:
   Measured by means of a melt tension tester manufactured by Toyo Seiki Seisakusho at a resin temperature of 190° C. at an extrusion rate of 10 mm/min at a winding-up speed of 6.28 m/min with an orifice diameter of 2.09 mm and an orifice length of 8.0 mm.
Die swell ratio:
   By means of a melt index measuring apparatus, the degree of swelling (%) in radial direction relative to the orifice diameter was measured after cooling of the parison extruded at a resin temperature of 190° C. at a shear rate of 300 sec$^{-1}$.

EXAMPLE 1

(I) Preparation of a transition metal catalyst component

Into a glass reactor having the interior thoroughly dried and substituted by nitrogen, 300 ml of a tetrahydrofuran solution of n-butylmagnesium chloride (0.670 mol) was charged, and 42.0 ml (0.7 g.atom of Si) of methylhydropolysiloxane having the terminals substituted by trimethylsilyl groups (viscosity: 30 centi stokes at 25° C.) was gradually dropwise added thereto under cooling and stirring. After addition of the entire amount, stirring was continued at 70° C. for 1 hour, and the mixture was cooled to room temperature to obtain a dark brown solution. To this solution, 400 ml of toluene was added, and 480 ml of a liquid mixture of tetrahydrofuran and toluene was distilled and removed under a reduced pressure of about 160 mmHg. Further, 480 ml of toluene was again added, and 480 ml of a liquid mixture of tetrahydrofuran and toluene was distilled and removed under the same reduced pressure. The obtained solution was diluted with toluene to obtain a toluene solution of component (A) (Mg: 1.35 mol/l).

Then, into a glass reactor having the interior thoroughly dried and substituted by nitrogen, 200 ml of toluene was introduced, and 7.5 ml (25 mmol) of Ti(Oi-C$_3$H$_7$)$_4$ and 9.5 ml (100 mmol) of VOCl$_3$ were added thereto under stirring. The reaction was conducted at 80° C. for 1 hour, and then the mixture was cooled to room temperature.

Into a glass reactor having the interior thoroughly dried and substituted by nitrogen, 40 ml of toluene and 50 ml (Mg: 67.5 mmol) of the above toluene solution of component (A) were introduced. 29.3 ml (Ti: 3.37 mmol, V: 13.5 mmol) of the above liquid mixture of titanium component and vanadium component, was gradually added thereto under stirring, and the reaction was conducted at 50° C. for 1 hour. Then, 17.6 ml of a toluene solution containing 67.5 mmol of SiCl$_4$ was gradually dropwise added thereto under stirring, and the reaction was conducted further at 50° C. for 1 hour. Then, 90 ml of a toluene solution containing 270 mmol of EtAlCl$_2$ was dropwise added over a period of 30 minutes under stirring. After the dropwise addition, the reaction was conducted further at 70° C. for 1 hour. To the slurry thereby obtained, n-hexane was added, and the soluble component was decanted and separated by filtration. This operation was operated 6 times, and solid transition metal catalyst component was obtained. This transition metal catalyst component was analyzed, whereby 1 g of the solid was found to contain 165 mg of Mg, 18.4 mg of Ti and 70.1 mg of V.

(2) Polymerization and copolymerization of ethylene

Into a stainless steel autoclave having a capacity of 1.5 l having the interior dried and substituted by ethylene, 600 ml of n-hexane was charged, the temperature was raised to 40° C., and 10 mmol of $Al(i-C_4H_9)_3$ was added. Then, 100 mg of the solid transition metal catalyst component prepared in step (1) was added thereto, and 0.10 kg/cm$^2$ of hydrogen was then introduced. While maintaining the internal temperature at 40° C., the polymerization reaction of step (c) was conducted under a total pressure of 4.5 kg/cm$^2$G while continuously introducing ethylene. When 11.7 l of ethylene was consumed, supply of ethylene was stopped, and the remaining ethylene was substituted by nitrogen. Then, the product was cooled, transferred to a flask and weighed, whereby it was 14.4 g and its intrinsic viscosity $[\eta]$ was 19.2. A portion thereof corresponding to a catalyst amount of 3.2 mg (ethylene polymer: 0.60 g) was charged into a stainless steel autoclave having a capacity of 1 l and having the interior substituted by nitrogen, together with 600 ml of n-hexane, and 1.0 mmol of $Al(i-C_4H_9)_3$ was added thereto. Then, the temperature was raised to 75° C., and 1.2 g of 1-butene was added under a hydrogen pressure of 0.8 kg/cm$^2$. Then, ethylene was continuously introduced, and the polymerization reaction of step (b) was conducted under a total pressure of 5.0 kg/cm$^2$G while maintaining the temperature at 75° C. When 47.8 l (59.8 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 5.0 kg/cm$^2$. Immediately, ethylene was continuously introduced, and the polymerization reaction of step (a) was conducted under a total pressure of 9.0 kg/cm$^2$G while maintaining the temperature at 80° C. When 47.2 l (59 g) of ethylene was consumed, supply of ethylene was stopped, followed by depressurizing, substitution and cooling, and then the solvent was separated and dried to obtain 118 g of an ethylene copolymer as the final product (intrinsic viscosity $[\eta]$: 2.11, MFR: 0.29/10 min). The measured value of the intrinsic viscosity $[\eta]$ of the product after completion of the polymerization of step (b) was 3.35, and the intrinsic viscosity $[\eta]$ of the ethylene copolymer formed in step (b) calculated from this measured value, was 3.22. Further, the intrinsic viscosity $[\eta]$ of the ethylene copolymer formed in step (a) was 0.85. The melt tension of the ethylene copolymer as the final product was 12.1 g, and the die swell ratio was 102%.

EXAMPLE 2

Using the catalyst prepared in Example 1, the operation was conducted in the same manner as in Example 1 except that the polymerization reaction in step (c) was conducted under a total pressure of 4.0 kg/cm$^2$G, and the supply of ethylene was changed to 8.2 l. The obtained amount was 10.2 g, and the intrinsic viscosity was 18.3. A portion thereof corresponding to a catalyst amount of 6 mg (ethylene polymer: 0.61 g) was charged into a stainless steel autoclave having a capacity of 1 l and having the interior substituted by nitrogen, together with 600 ml of n-hexane, and the polymerization reactions of steps (b) and (a) were conducted in the same manner as in Example 1 except that the supply of ethylene was changed to 29.4 l and 28.8 l, respectively, and the hydrogen pressure was changed to 0.7 kg/cm$^2$ and 4.5 kg/cm$^2$, respectively. The obtained amount of the ethylene copolymer as the final product was 72.5 g, the intrinsic viscosity $[\eta]$ was 2.26, and MFR was 0.22/10 min. The measured value of the intrinsic viscosity $[\eta]$ of the product after completion of the polymerization in step (b) was 3.64, and the intrinsic viscosity $[\eta]$ of the ethylene copolymer formed in step (b) calculated from this measured value, was 3.40. Further, the intrinsic viscosity $[\eta]$ of the ethylene copolymer formed in step (a) was 0.85. The melt tension of the ethylene copolymer as the final product was 13.8 g, and the die swell ratio was 102%.

EXAMPLE 3

(1) Transition metal catalyst component

A solid transition metal catalyst component was prepared in the same manner as in Example 1.

(2) Polymerization and copolymerization of ethylene

Into a stainless steel autoclave having a capacity of 1.5 l and having the interior dried and substituted by ethylene, 600 ml of n-hexane was charged, the temperature was raised 40° C., and 10 mmol of $Al(i-C_4H_9)_3$ was added thereto. Then, 100 mg of the solid transition metal catalyst component prepared in step (1) was added thereto, and then 0.1 kg/cm$^2$ of hydrogen was introduced. Then, the polymerization reaction of step (c) was conducted under a total pressure of 4 kg/cm$^2$G while continuously introducing ethylene and maintaining the internal temperature at a level of 40° C. When 36.7 l of ethylene was consumed, supply of ethylene was stopped, and the residual ethylene was substituted by nitrogen. The product was cooled, transferred to a flask and weighed, whereby it was 45.8 g, and its intrinsic viscosity $[\eta]$ was 18.6. A portion thereof corresponding to a catalyst amount of 6 mg (ethylene polymer: 2.75 g) was charged to a stainless steel autoclave having a capacity of 1 and having the interior substituted by nitrogen, together with 600 ml of n-hexane, and 1.0 mmol of $Al(i-C_4H_9)_3$ was added thereto. Then, the temperature was raised to 75° C., and 1.2 g of 1-butene was added under a hydrogen pressure of 0.7 kg/cm$^2$. Then, ethylene was continuously introduced, and the polymerization reaction of step (b) was conducted under a total pressure of 5.0 kg/cm$^2$G while maintaining the temperature at 75° C. When 28 l (35 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 4.7 kg/cm$^2$. Immediately, ethylene was continuously introduced, and the polymerization reaction of step (a) was conducted under a total pressure of 9.0 kg/cm$^2$ G while maintaining the temperature at 80° C. When 27.4 l (34.3 g) of ethylene was consumed, supply of ethylene was stopped, followed by depressurizing, substitution and cooling, and then the solvent was separated and dried to obtain 71.5 g of an ethylene copolymer as the final product (intrinsic viscosity $[\eta]$: 2.52, MFR: 0.11/10 min). The measured value of the intrinsic viscosity $[\eta]$ of the product after completion of the polymerization in step (b) was 3.42, and the intrinsic viscosity $[\eta]$ of the ethylene copolymer formed in step (b) calculated from this measured value, was 3.18. Further, the intrinsic viscosity [η] of the ethylene copolymer formed in step (a) was 0.68. The melt tension of the ethylene copolymer as the final product was 30.4 g, and the die swell ratio was 145%.

EXAMPLE 4

(1) Transition metal catalyst component

A solid transition metal catalyst component was prepared in the same manner as in Example 1.

(2) Polymerization and copolymerization of ethylene

Into a stainless steel autoclave having a capacity of 1.5 l and having the interior dried and substituted by ethylene, 600 ml of n-hexane was charged, the temperature was raised to 40° C., and 10 mmol of Al(i-C$_4$H$_9$)$_3$ was added thereto. Then, 100 mg of the solid transition metal catalyst component prepared in step (1) was added thereto, and 0.15 kg/cm$^2$ of hydrogen was introduced. While maintaining the internal temperature at 40° C., ethylene was continuously introduced, and the polymerization reaction of step (c) was conducted under a total pressure of 5 kg/cm$^2$. When 45 l of ethylene was consumed, supply of ethylene was stopped, and the residual ethylene was substituted by nitrogen, and the product was cooled, transferred to a flask and weighed, whereby it was 56.3 g, and its intrinsic viscosity [η] was 12.2. A portion thereof corresponding to a catalyst amount of 12 mg (ethylene polymer: 6.75 g) was charged into a stainless steel autoclave having a capacity of 1 l and having the interior substituted by nitrogen, together with 600 ml of n-hexane, and 1.0 mmol of Al(i-C$_4$H$_9$)$_3$ was added thereto. Then, the temperature was raised to 75° C., and 1.2 g of 1-butene was added thereto under a hydrogen pressure of 3.2 kg/cm$^2$. Then, ethylene was continuously introduced, and the polymerization reaction of step (b) was conducted under a total pressure of 9.0 kg/cm$^2$G while maintaining the temperature at 75° C. When 20.5 l (25.6 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 4.0 kg/cm$^2$. Immediately, ethylene was continuously introduced, and the polymerization reaction of step (a) was conducted under a total pressure of 9.0 kg/cm$^2$G while maintaining the temperature at 80° C. When 19.8 l (24.8 g) of ethylene was consumed, supply of ethylene was stopped, followed by depressurizing, substitution and cooling, and then the solvent was separated and dried to obtain 56.4 g of an ethylene copolymer as the final product (intrinsic viscosity [η]: 2.31, MFR: 0.25/10 min). The measured value of the intrinsic viscosity [η] of the product after completion of the polymerization in step (b) was 3.73, and the intrinsic viscosity [η] of the ethylene copolymer formed in step (b) calculated from this measured value, was 1.42. Further, the intrinsic viscosity [η] of the ethylene copolymer formed in step (a) was 0.51. The melt tension of the ethylene copolymer as the final product was 22.3 g, and the die swell ratio was 120%.

EXAMPLE 5

(1) Transition metal catalyst component

A solid transition metal catalyst component was prepared in the same manner as in Example 1.

(2) Polymerization and copolymerization of ethylene

Into a stainless steel autoclave having a capacity of 1.5 l and having the interior dried and substituted by ethylene, 600 ml of n-hexane was charged, the temperature was raised to 40° C., and 10 mmol of Al(i-C$_4$H$_9$)$_3$ was added thereto. Then, 100 mg of the solid transition metal catalyst component prepared in step (1) was added thereto, and then 1.25 kg/cm$^2$ of hydrogen was introduced, and 3.6 g of 1-butene was added thereto. While maintaining the internal temperature at 40° C., ethylene was continuously introduced, and the polymerization reaction of step (c) was conducted under a total pressure of 5 kg/cm$^2$G. When 59 l of ethylene was consumed, supply of ethylene was stopped, and the residual ethylene was substituted by nitrogen, and then the product was cooled, transferred to a flask and weighed, whereby it was 73.5 g, and its intrinsic viscosity [η] was 6.8. A portion thereof corresponding to a catalyst amount of 20 mg (ethylene polymer: 15.6 g) was charged into a stainless steel autoclave having a capacity of 1 l and having the interior substituted by nitrogen, together with 600 ml of n-hexane, and 1.0 mmol of Al(i-C$_4$H$_9$)$_3$ was added thereto. Then, the temperature was raised to 75° C., and 1.2 g of 1-butene was added thereto under a hydrogen pressure of 2.5 kg/cm$^2$. Then, ethylene was continuously introduced, and the polymerization reaction of step (b) was conducted under a total pressure of 9.0 kg/cm$^2$G while maintaining the temperature at 75° C. When 22.8 l (28.5 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 4.4 kg/cm$^2$. Immediately, ethylene was continuously introduced, and the polymerization reaction of step (a) was conducted under a total pressure of 9.0 kg/cm$^2$G while maintaining the temperature at 80° C. When 22 l (27.5 g) of ethylene was consumed, supply of ethylene was stopped, followed by depressurizing, substitution and cooling, and then the solvent was separated and dried to obtain 62.7 g of an ethylene copolymer as the final product (intrinsic viscosity [η]: 2.30, MFR: 0.23/10 min). The measured value of the intrinsic viscosity [η] of the product after completion of the polymerization in step (b) was 3.52, and the intrinsic viscosity [η] of the ethylene copolymer formed in step (b) as calculated from the measured value, was 1.56. Further, the intrinsic viscosity [η] of the ethylene copolymer formed in step (a) was 0.44. The melt tension of the ethylene copolymer as the final product was 21.8 g, and the die swell ratio was 127%.

COMPARATIVE EXAMPLE 1

(1) Preparation of a transition metal catalyst component

A solid transition metal catalyst component was prepared in the same manner as in Example 1 except that in Example 1, VOCl$_3$ was not used, and instead the amount of Ti(Oi-C$_3$H$_7$)$_4$ was increased to 50 mmol. This transition metal catalyst component was analyzed, whereby 1 g of the solid was found to contain 183 mg of Mg and 34.4 mg of Ti.

(2) Polymerization and copolymerization of ethylene

Polymerization and copolymerization of ethylene were conducted under the same conditions as in Example 2 using the solid transition metal catalyst component prepared in the above step (1). However, in step (c), the total pressure was 5.5 kg/cm$^2$, in step (b), the hydrogen pressure was 0.5 kg/cm², and in step (a), the hydrogen pressure was 3.8 kg/cm². The intrinsic viscosity [η] of the product obtained in step (c) was 18.7. The ethylene consumption in step (b) was 29.5 l (36.9 g), and the measured value of the intrinsic viscosity [η] of the product after completion of step (b) was 3.74, and the intrinsic viscosity [η] of the ethylene copolymer formed in step (b) calculated from the measured value, was 3.49. The ethylene consumption in step (a) was 28.6 l (35.8 g), and with respect to the final product, the obtained amount was 72.5 g, the intrinsic viscosity [η] was 2.34, and MFR was 0.21. The intrinsic viscosity [η] of the ethylene copolymer formed in step (a) was 0.90. Further, the melt tention of the final product was 8.4 g, and the die swell ratio was 84%.

COMPARATIVE EXAMPLE 2

Using the solid transition metal catalyst component prepared in Comparative Example 1, polymerization and copolymerization of ethylene were conducted under the same conditions as in Example 4. However, the total pressure in step (c) was 5.5 kg/cm², in step (b), the hydrogen pressure was 2.8 kg/cm², and in step (a), the hydrogen pressure was 3.4 kg/cm². The intrinsic viscosity [η] of the product obtained in step (c) was 12.7, and 7.1 g corresponding to a catalyst of 12 mg was used for the following. The ethylene consumption in step (b) was 21.5 l (26.9 g), and the measured value of the intrinsic viscosity [η] of the product after completion of the step (b) was 3.83, and the intrinsic viscosity [η] of the ethylene copolymer formed in step (b) calculated from the measured value, was 1.38. The ethylene consumption in step (a) was 20.8 l (26 g), and with respect to the final product, the obtained amount was 59.2 g, the intrinsic viscosity was 2.36, and MFR was 0.21. The intrinsic viscosity [η] of the ethylene copolymer formed in step (a) was calculated to be 0.52. Further, the melt tension of the final product was 8.5 g, and the die swell ratio was 88%

COMPARATIVE EXAMPLE 3

(1) Transition metal catalyst component

A solid transition metal catalyst component was prepared in the same manner as in Example 1.

(2) Polymerization and copolymerization of ethylene (two step polymerization)

Into a stainless steel autoclave having a capacity of 1.5 l and having the interior dried and substituted by nitrogen, 600 ml of n-hexane was charged, and 1.0 mmol of Al(i-C$_4$H$_9$)$_3$ was added thereto. Then, 6 mg of the solid transition metal catalyst component prepared in step (1) was added thereto, and the temperature was raised to 75° C. Then, 0.6 kg/cm² of hydrogen was introduced, and 1.2 g of 1-butene was added thereto. While maintaining the internal temperature at 75° C., ethylene was continuously introduced, and the polymerization reaction for the step for producing a high molecular weight component was conducted under a total pressure of 5 kg/cm²G. When 23 l (28.8 g) of ethylene was consumed, supply of ethylene was stopped, followed by depressurizing, substitution with nitrogen and cooling, and then 0.8 g of a sample for measuring the intrinsic viscosity was sampled. Then, the temperature was raised to 80° C., and 1.2 g of 1-butene was added thereto under a hydrogen pressure of 4.5 kg/cm². Immediately, ethylene was continuously introduced, and the polymerization reaction of step for producing a low molecular weight component was conducted under a total pressure of 9.0 kg/cm²G while maintaining the temperature at 80° C. When 22.3 l (27.9 g) of ethylene was consumed, supply of ethylene was stopped, followed by depressurizing, substitution and cooling, and then the solvent was separated and dried to obtain 36.1 of an ethylene copolymer as the final product (intrinsic viscosity [η]: 2.31, MFR: 0.22/10 min). The intrinsic viscosity [η] of the high molecular weight component was 3.80, the intrinsic viscosity [η] of the low molecular weight component was 0.82, the melt tension of the final product was 8.1 g, and the die swell ratio was 83%.

EXAMPLE 6

(1) Transition metal catalyst component

A solid transition metal catalyst component was prepared in the same manner as in Example 1.

(2) Polymerization and copolymerization of ethylene

Into a stainless steel autoclave having a capacity of 1.5 l and having the interior dried and substituted by ethylene, 600 ml of n-hexane was charged, the temperature was raised to 50° C., and 10 mmol of Al(n-C$_6$H$_{13}$)$_3$ was added thereto. Then, 50 mg of the solid transition metal catalyst component prepared in step (1) was added thereto, and while maintaining the temperature at 50° C., ethylene was continuously introduced, and the polymerization reaction of step (c) was conducted under a total pressure of 4.5 kg/cm²G. When 4.5 l of ethylene was consumed, supply of ethylene was stopped, and the residual ethylene was substituted by nitrogen, and the product was cooled, transferred to a flask and weighed, whereby it was 5.6 g, and its intrinsic viscosity [η] was 18.4. A portion thereof corresponding to a catalyst amount of 6 mg (ethylene polymer: 0.68 g) was charged into a stainless steel autoclave having a capacity of 1 l and having the interior substituted by nitrogen, together with 600 ml of n-hexane, and 1.5 mmol of Al(n-C$_6$H$_{13}$)$_3$ was added thereto. Then, the temperature was raised to 80° C., and 1.2 g of propylene was added thereto under a hydrogen pressure of 5.8 kg/cm². Then, ethylene was continuously introduced, and the polymerization reaction of step (a) was conducted under a total pressure of 9.0 kg/cm²G while maintaining the temperature at 80° C. When 25 l (31.3 g) of ethylene was consumed, supply of ethylene was stopped, followed by depressurizing, substitution and cooling, and then 0.8 g of a sample for measuring the intrinsic viscosity was sampled. Then, the temperature was raised to 75° C., and 1.2 g of propylene was added thereto under a hydrogen pressure of 0.4 kg/cm². Immediately, ethylene was continuously introduced, and the polymerization reaction of step (b) was conducted under a total pressure of 5.0 kg/cm²G while maintaining the temperature at 75° C. When 36 l (45 g) of ethylene was consumed, supply of ethylene was stopped, followed by depressurizing, substitution and cooling, and then the solvent was separated and dried to obtain 76.5 g of an ethylene copolymer as the final product (intrinsic viscosity [η]: 3.02, MFR: 0.038/10 min). The measured value of the intrinsic viscosity [η] of the product after completion of the polymerization in step (b) was 0.90, and the intrinsic viscosity [η] of the ethylene copolymer formed in step (a) calculated from this measured value, was 0.52. Further, the intrinsic viscosity [η] of the ethylene copolymer formed in step (b) was 4.51. The melt tension of the ethylene copolymer as the final product was 24.3 g, and the die swell ratio was 98%.

EXAMPLE 7

(1) Transition metal catalyst component

A solid transition metal catalyst component was prepared in the same manner as in Example 1 except that at the time of preparing a reaction mixture solution of the titanium component and the vanadium component, 13.8 ml (150 mmol) of $VOCl_3$ was used instead of 9.5 ml (100 mmol) of $VOCl_3$, and at the time of preparing the catalyst, 29.8 ml of its toluene solution was added. The formed solid catalyst was analyzed, whereby 1 g of the catalyst was found to contain 16.5 mg of Ti and 77.1 mg of V.

(2) Polymerization and copolymerization of ethylene

Into a stainless steel autoclave having a capacity of 1.5 l and having the interior dried and substituted by ethylene, 600 ml of n-hexane was charged, the temperature was raised to 50° C., and 10 mmol of $Al(C_2H_5)_3$ was added thereto. Then, 100 mg of the solid transition metal catalyst component prepared in step (1) was added thereto, and 0.1 kg/cm² of hydrogen was introduced. While maintaining the internal temperature at 40° C., ethylene was continuously introduced, and the polymerization reaction of step (c) was conducted under a total pressure of 4 kg/cm². When 33.5 l of ethylene was consumed, supply of ethylene was stopped, and the residual ethylene was substituted by nitrogen, and the product was cooled, transferred to a flask and weighed, whereby it was 42 g, and its intrinsic viscosity $[\eta]$ was 18.2. A portion thereof corresponding to a catalyst amount of 6 mg (ethylene polymer: 2.52 g) was charged into a stainless steel autoclave having a capacity of 1 l and having the interior substituted by nitrogen, together with 600 ml of n-hexane, and 1.0 mmol of $Al(C_2H_5)_3$ was added thereto. Then, the temperature was raised to 75° C., and 1.2 g of 1-butene was added thereto under a hydrogen pressure of 0.7 kg/cm². Then, ethylene was continuously introduced, and the polymerization reaction of step (b) was conducted under a total pressure of 5.0 kg/cm²G while maintaining the temperature at 75° C. When 22.5 l (28.1 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 5.0 kg/cm². Immediately, ethylene was continuously introduced, and the polymerization reaction of step (a) was conducted under a total pressure of 9.0 kg/cm²G while maintaining the temperature at 80° C. When 41 l (51.3 g) of ethylene was consumed, supply of ethylene was stopped, followed by depressurizing, substitution and cooling, and then the solvent was separated and dried to obtain 78.8 g of an ethylene copolymer as the final product (intrinsic viscosity $[\eta]$: 2.22, MFR: 0.23/10 min). The measured value of the intrinsic viscosity $[\eta]$ of the product after completion of the polymerization in step (b) was 4.83, and the intrinsic viscosity $[\eta]$ of the ethylene copolymer formed in step (b) calculated from the measured value, was 3.63. Further, the intrinsic viscosity $[\eta]$ of the ethylene copolymer formed in step (a) was 0.61. The melt tension of the ethylene copolymer as the final product was 19.6 g, and the die swell ratio was 132%.

EXAMPLE 8

(1) Transition metal catalyst component

A solid transition metal catalyst component was prepared in the same manner as in Example 1.

(2) Polymerization and copolymerization of ethylene

Into a stainless steel autoclave having a capacity of 1.5 l and having the interior dried and substituted by ethylene, 600 ml of n-hexane was charged, the temperature was raised to 40° C., and 10 mmol of $Al(C_4H_9)_3$ was added thereto. Then, 50 mg of the solid transition metal catalyst component prepared in step (1) was added thereto. Then, 0.3 kg/cm² of hydrogen was introduced, and 1.8 g of 1-butene was added thereto. Then, while maintaining the internal temperature at 40° C., ethylene was continuously introduced, and the polymerization reaction of step (c) was conducted under a total pressure of 5 kg/cm²G. When 21.4 l of ethylene was consumed, supply of ethylene was stopped, and the residual ethylene was substituted by nitrogen. The product was cooled, transferred to a flask and weighed, whereby it was 26.7 g, and its intrinsic viscosity $[\eta]$ was 14.2. A portion thereof corresponding to a catalyst amount of 12 mg (ethylene polymer: 6.41 g) was charged into a stainless steel autoclave having a capacity of 1 l and having the interior substituted by nitrogen, together with 600 ml of n-hexane, and 1.0 mmol of $Al(C_4H_9)_3$ was added thereto. Then, the polymerization reaction of step (b) was conducted under the same conditions as in Example 4 except that the hydrogen pressure was 3.8 kg/cm², and the ethylene consumption was 15 l (18.8 g). Further, 0.8 g of a sample for measuring the intrinsic viscosity was sampled, and then the polymerization reaction of step (a) was conducted under the same conditions as in Example 4 except that the ethylene consumption 26.5 l. When 26.5 l (33.1 g) of ethylene was consumed, supply of ethylene was stopped, followed by depressurizing, substitution and cooling, and then the solvent was separated and dried to obtain 58.1 g of ethylene copolymer as the final product (intrinsic viscosity $[\eta]$: 2.35, MFR: 0.17/10 min). The measured value of the intrinsic viscosity $[\eta]$ of the product after completion of the polymerization in step (b) was 4.89, and the intrinsic viscosity $[\eta]$ of the ethylene copolymer formed in step (b) calculated from this measured value, was 1.71. The intrinsic viscosity $[\eta]$ of the ethylene copolymer formed in step (a) was 0.48. The melt tension of the ethylene copolymer of the final product was 24.6 g, and the die swell ratio was 119%.

EXAMPLE 9

(1) Transition metal catalyst component

Into a glass reactor having the interior thoroughly dried and substituted by nitrogen, 400 ml of a diisopropyl ether solution of n-butylmagnesium chloride (0.670 mol) was charged, and 42.0 ml (0.7 g.atom of Si) of methylhydropolysiloxane having the terminals substituted by trimethylsilyl groups (viscosity: 30 centistokes at 25° C.) was gradually dropwise added thereto under stirring and cooling. After the dropwise addition, stirring was continued for 1 hour to obtain a brown transparent reaction product. To this solution, 250 ml of n-heptane was added for dilution. Then, 0.67 mol of 2-ethylhexanol was dropwise added and reacted over a period of 1 hour. After completion of the dropwise addition, distillation was conducted under a reduced pressure of about 200 mmHg to distill 500 ml and to remove di-isopropyl ether. The product was diluted with n-heptane to obtain a colorless transparent solution of component (A) (Mg: 1.0 mol/l).

Then, into a glass reactor having the interior thoroughly dried and substituted by nitrogen, 200 ml of n-heptane was introduced, and 5.5 ml (50 mmol) of TiCl$_4$ and 9.5 ml (100 mmol) of VOCl$_3$ were added under stirring, whereupon the reaction was conducted at 80° C. for 1 hour. Then, the reaction mixture was cooled to room temperature.

Into a glass reactor having the interior thoroughly dried and substituted by nitrogen, 40 ml of n-heptane and 10 ml (Mg: 10 mg.atom) of the above n-heptane solution of component (a) were introduced. 2.6 ml (Ti: 0.60 mmol, V: 1.2 mmol) of the above liquid mixture of the titanium component and the vanadium component was slowly added under stirring, and the mixture was reacted at room temperature for 1 hour. Then, while maintaining the liquid temperature at 25° C., 20 ml of a n-heptane solution of ethylaluminum sesquichloride (1.0 mol/l) was added thereto. Then, the reaction was conducted for 1 hour to obtain a transition metal catalyst component.

(2) Polymerization and copolymerization of ethylene

Into a stainless steel autoclave having a capacity of 1.5 l and having the interior dried and substituted by ethylene, 600 ml of n-hexane was charged, the temperature was raised to 40° C., and 10 mmol of Al(i-C$_4$H$_9$)$_3$ was added thereto. Then, 5.0 ml of the transition metal catalyst component prepared in step (1) was added thereto. Then, 0.10 kg/cm$^2$ of hydrogen was introduced. While maintaining the internal temperature at 40° C., ethylene was continuously introduced and the polymerization reaction of step (c) was conducted under a total pressure of 5.5 kg/cm$^2$G. When 10.3 l of ethylene was consumed, supply of ethylene was stopped, and the residual ethylene was substituted by nitrogen, and the product was cooled, transferred to a flask and weighed, whereby the amount of the formed ethylene polymer was 12.9 g, and its intrinsic viscosity [$\eta$] was 18.8. 0.56 g thereof was charged into a stainless steel autoclave having a capacity of 1 l and having the interior substituted by nitrogen, together with 600 ml of n-hexane and 1.0 mmol of Al(i-C$_4$H$_9$)$_3$ was added thereto. Then, the temperature was raised to 75° C., and 1.2 g of 1-butene was added under a hydrogen pressure of 0.8 kg/cm$^2$. Then, ethylene was continuously introduced, and the polymerization reaction of step (b) was conducted under a total pressure of 9.0 kg/cm$^2$G while maintaining the temperature at 75° C. When 44.8 l (56 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added under a hydrogen pressure of 2.2 kg/cm$^2$. Immediately, ethylene was continuously introduced, and the polymerization reaction of step (a) was conducted under a total pressure of 9.0 kg/cm$^2$G while maintaining the temperature at 80° C. When 44 l (55 g) of ethylene was consumed, supply of ethylene was stopped, followed by depressurizing, substitution and cooling, and then the solvent was separated and dried to obtain 110 g of an ethylene copolymer as the final product (intrinsic viscosity [$\eta$]: 2.16, MFR: 0.27/10 min). The measured value of the intrinsic viscosity [$\eta$] of the product after completion of the polymerization in step (b) was 3.57, and the intrinsic viscosity [$\eta$] of the ethylene copolymer formed in step (b) calculated from this measured value, was 3.42. Further, the intrinsic viscosity [$\eta$] of the ethylene copolymer formed in step (a) was 0.70. The melt tension of the final product was 12.5 g, and the die swell ratio was 104%.

EXAMPLE 10

(1) Transition metal catalyst component

A solid transition metal catalyst component was prepared in the same manner as in Example 9.

(2) Polymerization and copolymerization of ethylene

Into a stainless steel autoclave having a capacity of 1.5 l, and having the interior dried and substituted by ethylene, 600 ml of n-hexane was charged, the temperature was raised to 40° C., and 10 mol of Al(i-C$_4$H$_9$)$_3$ was added thereto. Then, 5.0 ml of the transition metal catalyst component prepared in step (1) was added thereto. Then, 0.15 kg/cm$^2$ of hydrogen was introduced. While maintaining the internal temperature at 40° C., ethylene was continuously introduced, and the polymerization reaction of step (c) was conducted under a total pressure of 5 kg/cm$^2$G. When 48.5 l of ethylene was consumed, supply of ethylene was stopped, and the residual ethylene was substituted by nitrogen, and the product was cooled, transferred to a flask and weighed, whereby the formed ethylene copolymer was 60.6 g, and its intrinsic viscosity [$\eta$] was 14.2. Then, 7.58 g thereof was charged into a stainless steel autoclave having a capacity of 1 l and having the interior substituted by nitrogen, together with 600 ml of n-hexane, and 1.0 mmol of Al(i-C$_4$H$_9$)$_3$ was added thereto. Then, the temperature was raised to 75° C., and 1.2 g of 1-butene was added under a hydrogen pressure of 1.3 kg/cm$^2$. Then, ethylene was continuously introduced, and the polymerization reaction of step (b) was conducted under a total pressure of 9.0 kg/cm$^2$G while maintaining the temperature at 75° C. When 27.5 l (34.4 g) of ethylene was consumed, supply of ethylene was stopped, followed by depressurizing, substitution and cooling, and then 0.8 g of a sample for measuring the intrinsic viscosity was sampled. Then, the temperature was raised to 80° C., and 1.2 g of 1-butene was added thereto under a hydrogen pressure of 1.8 kg/cm$^2$. Immediately, ethylene was continuously introduced, and the polymerization reaction of step (a) was conducted under a total pressure of 9.0 kg/cm$^2$G while maintaining the temperature at 80° C. When 27 l (33.8 g) of ethylene was consumed, supply of ethylene was stopped, followed by depressurizing, substitution and cooling, and then the solvent was separated and dried to obtain 67.4 g of an ethylene copolymer as the final product (intrinsic viscosity [$\eta$]: 1.99, MFR: 0.42/10 min). The measured value of the intrinsic viscosity [$\eta$] of the product after completion of the polymerization in step (b) was 3.54, and the intrinsic viscosity [$\eta$] of the ethylene copolymer formed in step (b) calculated from the measured value, was 1.19. Further, the intrinsic viscosity [$\eta$] of the ethylene copolymer formed in step (a) was 0.45. The melt tension of the ethylene copolymer as the final product was 18.2 g, and the die swell ratio was 122%.

Table 1 summarizes the intrinsic viscosities [$\eta$] and the blending proportions of the respective components produced in steps (a), (b) and (c) and the intrinsic viscosities [$\eta$], MFR, the melt tension (MS in the Table) and DSP (die swell ratio being represented by %) of the final products in Examples 1 to 10 and Comparative Examples 1 to 3.

TABLE 1

| | Component of step (c) | | Components of steps (a) and (b) | | | Final product | | | |
|---|---|---|---|---|---|---|---|---|---|
| | | (c) | (a) | (b) | (a) | | | MS | DSP |
| | [η] | (a) + (b) | [η] | [η] | (b) | [η] | MFR | g | % |
| Example 1 | 19.2 | 0.39/100 | 0.85 | 3.22 | 50/50 | 2.11 | 0.29 | 12.1 | 102 |
| Example 2 | 18.3 | 0.85/100 | 0.85 | 3.40 | 50/50 | 2.26 | 0.22 | 13.8 | 102 |
| Example 3 | 18.6 | 4.0/100 | 0.68 | 3.18 | 50/50 | 2.52 | 0.11 | 30.4 | 145 |
| Example 4 | 12.2 | 13.6/100 | 0.51 | 1.42 | 50/50 | 2.31 | 0.25 | 22.3 | 120 |
| Example 5 | 6.8 | 33.1/100 | 0.44 | 1.56 | 50/50 | 2.30 | 0.23 | 21.8 | 127 |
| Comparative Example 1 | 18.7 | 0.85/100 | 0.90 | 3.49 | 50/50 | 2.34 | 0.21 | 8.4 | 84 |
| Comparative example 2 | 12.7 | 13.6/100 | 0.52 | 1.38 | 50/50 | 2.36 | 0.21 | 8.5 | 88 |
| Comparative Example 3 | — | 0/100 | 0.82 | 3.80 | 50/50 | 2.31 | 0.22 | 8.1 | 83 |
| Example 6 | 18.4 | 0.89/100 | 0.52 | 4.51 | 41/59 | 3.02 | 0.038 | 24.3 | 98 |
| Example 7 | 18.2 | 3.3/100 | 0.61 | 3.63 | 35/65 | 2.22 | 0.23 | 19.6 | 132 |
| Example 8 | 14.2 | 12.4/100 | 0.48 | 1.71 | 65/35 | 2.35 | 0.17 | 24.6 | 119 |
| Example 9 | 18.8 | 0.51/100 | 0.70 | 3.42 | 50/50 | 2.16 | 0.27 | 12.5 | 104 |
| Example 10 | 14.2 | 12.5/100 | 0.45 | 1.19 | 50/50 | 1.99 | 0.42 | 18.2 | 122 |

EXAMPLE 11

Using a stainless steel autoclave having a capacity of 3 l, step (c) was conducted under the same conditions as in Example 3 in a scale twice as much as Example 3. Of the product obtained in step (c), 55 g ([η]: 18.2) was introduced into a stainless steel autoclave having a capacity of 30 l, and steps (b) and (a) were conducted under the same conditions as in Example 3 in a scale twenty times that of Example 3. The amount of the finally obtained ethylene copolymer was 1,450 g, and its physical properties were such that MFR: 0.12, [η]: 2.50, MS: 29.5 g and DSP: 146.

A single shaft extrusion attachment and a film die were mounted on Rheocode 90 manufactured by German HAAKE Company, and using the above sample, film-forming was conducted with a screw diameter of 19 mm, a die outer diameter of 25.4 mm and a bend diameter of 150 mm at a resin temperature of 200° C. at an extrusion rate of 2 kg/hr, whereby a film free from wrinkles or sagging was obtained, and no gelling or hard spots were observed. Fish-eyes were one fish-eye/50×50 mm.

EXAMPLE 12

Using a stainless steel autoclave having a capacity of 10 l, step (c) was conducted under the same conditions as in Example 8 in a scale seven times that of Example 8. Of the product obtained in step (c), 128 g ([η]: 18.2) was charged into a stainless steel autoclave having a capacity of 30 l, and steps (b) and (a) were conducted in the same manner as in Example 3 in a scale twenty times that of Example 3. The amount of the ethylene copolymer as the final product was 1,160 g, and its physical properties were such that MFR: 0.16, [η]: 2.38, MS: 24.8 g and DSP: 118%.

Using this sample, film-forming was conducted in the same manner as in Example 11, whereby a film free from wrinkles or sagging was obtained, no gellation or hard spots were observed. Fish-eyes were at a level of two fish-eyes/50×50 mm.

According to the present invention, an ethylenic polymer composition containing a ultra-high molecular weight component can be obtained by polymerizing ethylene or copolymerizing ethylene with an α-olefin by three-step polymerization using a polymerization catalyst comprising, as a transition metal component, a compound obtained by reacting four components and comprising a step of preparing a ultra-high molecular weight component as a polymerization step, wherein the amounts and the intrinsic viscosities of the polymers formed in the respective steps are specified. The ethylenic polymer composition obtained by this method has a high melt tension relative to MFR and shows excellent performance in blow molding, such as enough thickness of pinch-off edges. Therefore, it is particularly suitable for molding such as inflation molding or blow molding.

The method of the present invention has a feature that the amount of the ultra-high molecular weight component effective to provide a high melt tension and other desired physical properties, can be selected within a wide range of from a very small amount to a relatively large amount.

Further, according to the present invention, the effects for improving the physical properties can be attained even when the ultra-high molecular weight component has a relatively low intrinsic viscosity, and therefore such a component can well be mixed with other components, thus presenting excellent molding processability.

We claim:

1. A method for producing an ethylenic polymer composition, comprising polymerizing ethylene or copolymerizing ethylene with an α-olefin, in the presence of a catalyst, to produce an ethylenic polymer, said catalyst including a transition metal compound and an organic aluminum compound of the formula

$$R^4{}_cAlY_{3-c}$$

wherein $R^4$ is a $C_1$–$C_{12}$ hydrocarbon group, Y is a hydrogen atom, a halogen atom or an alkoxide group, and $1 \leq c \leq 3$, wherein the transition metal compound is a product obtained by reacting the following components (A), (B), (C) and (D) so that component (D) is reacted last:

(A) a reaction product obtained by reacting a hydropolysiloxane with an organomagnesium compound, or a compound obtained by reacting said reaction product further with at least one nucleophilic reagent selected from the group consisting of alcohols, aldehydes and ketones, wherein said hydropolysiloxane is a silicon-containing compound having a structural unit of the formula:

$R^2{}_aH_bSiO$ wherein $R^2$ is a $C_1$–$C_{12}$ hydrocarbon group, an alkoxy group or a phenoxy group, a is 0 or 1, and b is 1 or 2, provided a+b=2, and wherein said organomagnesium compound is a compound of the formula $(MgR^3{}_2)_p \cdot (MgR^3X)_q$ wherein $R^3$ is a $C_1$–$C_{12}$ hydrocarbon group, X is a halogen atom, and each of p and q is a number of from 0 to 1, provided p+q=1, or an ether complex thereof, or a mixture of said organomagnesium compound and an ether complex thereof, (B) a titanium compound of the formula (II):

$$Ti(OR)_mX_{4-m} \qquad (I)$$

wherein R is a $C_1$–$C_{12}$ hydrocarbon group, X is a halogen atom, and $0 \leq m \leq 4$, (C) a vanadium compound of the formula (II) or (III):

$$VO(OR^1)_nX_{3-n} \qquad (II)$$

wherein $R^1$ is a $C_1$–$C_{12}$ hydrocarbon group, X is a halogen atom, and $0 \leq n \leq 3$, $$VX_4 \qquad (III)$$

wherein X is a halogen atom, (D) a silicon halide compound and an organic aluminum halide compound, and as polymerization steps, the following three polymerization steps (a), (b) and (c) are conducted in any order:

(a) a step of polymerization to form an ethylenic (co)polymer having an intrinsic viscosity [η] of from 0.4 to 1.5, (b) a step of polymerization to form an ethylenic (co)polymer having an intrinsic viscosity [η] of from 0.7 to 6, and (c) a step of polymerization to form an ethylenic (co)polymer having an intrinsic viscosity [η] of from 6 to 20, wherein the polymerized amounts in the respective steps are controlled to be within the following ranges by weight ratio:

{polymerized amount in step (a)+polymerized amount in step (b)}:polymerized amount in step (c)=100:0.3 to 100:40, and polymerized amount in step (a):polymerized amount in step (b)=70:30 to 30:70, so that the intrinsic viscosity [η] of the final product is from 1 to 5.

2. The method according to claim 1, wherein the silicon halide compound for component (D) is a compound of the formula:

$R^4{}_rSiX_{4-r}$ wherein $R^4$ is a hydrogen atom or a $C_1$–$C_8$ hydrocarbon group, X is a halogen atom, and $0 \leq r \leq 3$.

3. The method according to claim 1, wherein the organic aluminum halide compound for component (D) is a compound of the formula:

$R^5{}_sAlX_{3-s}$ wherein $R^5$ is a $C_1$–$C_{12}$ hydrocarbon group, X is a halogen atom, and $1 \leq s \leq 2$.

4. The method according to claim 1, wherein components (B) and (C) are used in the amount of from 0.0001 to 0.5 mol and from 0.01 to 1 mol, respectively, per g.atom of Mg in component (A).

5. The method according to claim 4, wherein the silicon halide compound for component (D) is used in the amount of from 0.1 to 5.0 mol per g.atom of Mg in component (A), and the organic aluminum halide compound for component (D) is used in the amount of from 0.1 to 50 mol per g.atom of Mg in component (A).

6. The method according to claim 5, wherein the silicon halide compound for component (D) is used in the amount of from 0.5 to 2.0 mol per g.atom of Mg in component (A), and the organic aluminum halide compound for component (D) is used in the amount of from 0.5 to 10 mol per g.atom of Mg in component (A).

7. The method according to claim 1, wherein $R^4{}_cAlY_{3-c}$ is selected from the group consisting of $Al(CH_3)_3$, $Al(C_2H_5)_3$, $Al(i-C_4H_9)_3$, $(C_2H_5)_2AlH$, $(i-C_4C_9)_2AlH$, and $(C_2H_5)_2Al(OC_2H_5)$.

8. The method according to claim 1, wherein an α-olefin is used in the amount of up to 20% relative to ethylene.

9. The method according to claim 1, wherein the transition metal compound is a product obtained by preliminarily mixing and reacting components (B) and (C) at a temperature of from 20° to 150° C.

* * * * *